United States Patent [19]
Mahabadi et al.

[11] Patent Number: 5,567,566
[45] Date of Patent: Oct. 22, 1996

[54] LATEX PROCESSES

[75] Inventors: Hadi K. Mahabadi, Etobicoke; Grazyna E. Kmiecik-Lawrynowicz, Burlington; T. Hwee Ng, Mississauga, all of Canada

[73] Assignee: Xerox Corporation, Stamford, Conn.

[21] Appl. No.: 605,423

[22] Filed: Feb. 22, 1996

[51] Int. Cl.$^6$ .................................................. G03G 9/087
[52] U.S. Cl. ............................................................ 430/137
[58] Field of Search ............................................... 430/137

[56] References Cited

U.S. PATENT DOCUMENTS

| | | | |
|---|---|---|---|
| 4,983,488 | 1/1991 | Tan et al. | 430/137 |
| 4,996,127 | 2/1991 | Hasegawa et al. | 430/109 |
| 5,346,797 | 9/1994 | Kmiecik-Lawrynowicz et al. | 430/137 |
| 5,418,108 | 5/1995 | Kmiecik-Lawrynowicz et al. | 430/137 |
| 5,501,935 | 3/1996 | Patel et al. | 430/137 |

*Primary Examiner*—Roland Martin
*Attorney, Agent, or Firm*—E. O. Palazzo

[57] ABSTRACT

A process for the preparation of polymer latex particles comprising:

(a) conducting a pre-reaction emulsification which comprises emulsification of the polymerization reagents of monomer, polar comonomer, water, surfactant, chain transfer agent, and initiator, and wherein said emulsification is accomplished at a low temperature of from about 3° to about 35° C.; and (b) accomplishing an emulsion polymerization, which comprises heating the emulsified mixture of (a) in a reactor at from about 25° to about about 125° C. and retaining the contents of the reactor for an effective time period at said temperature of from about 25° to about about 12° C., followed by cooling.

11 Claims, No Drawings

LATEX PROCESSES

BACKGROUND OF THE INVENTION

The present invention is generally directed to toner processes, and more specifically, to the preparation of resin or polymer particles by a process comprised of (a) pre-emulsification and (b) emulsion polymerization, and which resin or polymer product particles can be selected for use in toner aggregation and coalescence processes, reference, for example, U.S. Pat. Nos. 5,278,020; 5,344,738; 5,403,693; 5,418,108; and 5,364,729, the disclosures of which are totally incorporated herein by reference. In embodiments, the present invention is directed to the economical in situ chemical preparation of toners without the utilization of the known pulverization and/or classification methods, and wherein toners with an average volume diameter of from about 1 to about 25, and preferably from 1 to about 10 microns, and narrow size distribution can be obtained, the size distribution as measured by GSD being in the range, for example, of about 1.05 to about 1.40, and preferably in the range of 1.05 to 1.3. The resulting toners can be selected for known electrophotographic imaging and printing processes, including color processes, and lithography.

In embodiments, the present invention is directed to the preparation of a latex comprising (a) pre-emulsification and (b) emulsion polymerization processes and preferably a batch process comprised of (a) batch pre-emulsification and (c) batch emulsion polymerization with controlled latex properties whereby a stable emulsion of resin particles in water with desirable triboelectrical toner properties can be synthesized and wherein the colloidal properties of the resulting resin particles can be controlled in a manner that the latexes of resin particles may be aggregated and coalesced in the processes described in U.S. Pat. No. 5,403,693, and in similar processes, over a wider range of conditions and with improved consistency and reproducibility.

In U.S. Pat. No. 5,278,020, there is illustrated, for example, the preparation of latexes, by batch emulsion polymerization without utilizing a pre-emulsification step. When the pre-emulsification step is not employed the resulting latexes may not have the same properties and as a result the emulsion may not be stable. Therefore, unstable latexes with undesired properties have to be removed to prevent any adverse effect on the final toner. Since both emulsion batch to batch variability and unstability are generally not desired, there exists a need for a emulsion polymerization process wherein a stable emulsion of resin particles with reproducible properties can be synthesized and which resin particles can be selected for use in toner aggregation and coalescence processes.

Accordingly, the present invention is directed, in embodiments, to the pre-emulsification of polymerization reagents in water containing a mixture of anionic and nonionic surfactants, prior to the emulsion polymerization to ensure homogeneous concentration of reagents of the emulsion system throughout reactor, in order to produce a stable resin particles emulsion with consistent properties that are more desirable for aggregation/coalescence processes than the properties of similar latexes made without a pre-emulsification step. Pre-emulsification refers to a process, which, for example, comprises mixing comonomers, initiators, chain transfer agents in water containing a mixture of anionic and nonionic surfactants at low temperature such as for example from about 3° to about 30° C. for about 15 to about 60 minutes, using a mechanical stirrer with speed of from about 100 to about 400 rpm. The present invention in embodiments utilizes the above mentioned pre-emulsification step prior to the emulsion polymerization step to minimize or eliminate batch to batch variation of latex properties and minimize the production of resin particles with undesirable properties which increases the breakdown of aggregated particles that may occur when practicing the processes disclosed in U.S. Pat. No. 5,403,693 and similar processes, thereby resulting in a superior process wherein the toner properties are controlled over a substantially wider range of conditions.

While not being desired to be limited by theory, it is believed that during emulsion polymerization in the water, a hydrophobic monomer or mixture of comonomer and chain transfer agents can be formed. At the start of polymerization most of hydrophobic monomers or mixture of comonomers and chain transfer agents are located in large droplets, or monomer droplets, some of which are solubilized within the micelles (polymerization sites) and some in the water. As the polymerization reaction proceeds within the monomer-swollen micelles, these micelles deplete the monomer and establish a thermodynamic driving force which causes mass transfer from the monomer droplets through the water phase into the newly formed and growing polymer particles. When a mixture of nonpolar and polar comonomers and chain transfer agents are employed in an emulsion polymerization, it is important that the concentration of polar and nonpolar comonomers and chain transfer agents be the same at any given time in all monomer droplets and in all micelles. This ensures that all polymer particles produced in emulsion polymerization have the same properties and that the emulsion polymerization product is stable and reproducible. In the present invention, emulsification prior to emulsion polymerization (pre-emulsification) is included to ensure the concentration of polymerization ingredients are the same or similar in the monomer droplets, in water, and in the micelles or growing polymer particles, thereby eliminating the formation of particles with undesirable properties and production of unstable emulsion.

While not being desired to be limited by theory, it is believed that in the emulsion polymerization some microsuspended droplets may formed which can polymerize via suspension polymerization kinetics to form polymer particles which have different properties comparable with those formed by emulsion kinetics. Therefore, an emulsion product containing some polymer particles having undesirable properties is produced which is not suitable both for aggregation/coalescence processes and for generating toner compositions. The formation of a microsuspension can also aggravate problems associated with the exotherm or cause an increase of reaction temperature during emulsion polymerization. The use of water soluble comonomers and/or chain transfer agents in an emulsion polymerization amplify the formation of undesirable microsuspended droplet and microsuspension polymer particles in the emulsion product. When water soluble comonomers and/or chain transfer agents are used in an emulsion polymerization system, it is important to employ a pre-emulsification step prior to emulsion polymerization with optimum process conditions to eliminate formation of microsuspension.

Accordingly, the present invention is directed, in embodiments, to the pre-emulsification of polymerization reagents including water soluble comonomers and/or chain transfer agents in water containing a mixture of anionic and nonionic surfactants, prior to the emulsion polymerization to prevent formation of microsuspension polymer particles and to ensure a homogeneous concentration of reagents to produce a stable emulsion with consistent properties that are more desirable for aggregation/coalescence processes than the properties of similar latexes prepared without pre-emulsification; and minimizing problems associated with exotherm during emulsion polymerization. The pre-emulsification refers to a process, which comprises mixing comonomers, or comonomer, initiators, chain transfer agents and water, containing a mixture of anionic and nonionic surfactants at low temperature, such as for example from about 3° C. to about 30° C. for an effective period of time, for example for about 15 to about 60 minutes, using a mechanical stirrer operating at a speed of from about 100 to about 400 rpm. The present invention in embodiments utilizes the above mentioned pre-emulsification step prior to the final emulsion polymerization to minimize or eliminate batch to batch variation of the latex properties during emulsion polymerization and to minimize production of resin particles with undesirable properties which increases the breakdown of aggregated particles that may occur when practicing the processes disclosed in U.S. Pat. No. 5,403,693 and similar processes, thereby resulting in a superior process wherein the toner properties are controlled over a substantially wider range of conditions. As illustrated in the Examples hereinafter, pre-emulsification prior to emulsion polymerization generates a stable emulsion with a minimum exotherm and provides polymer particles with desired property reproducibly.

In embodiments, the present invention is directed to a two step pre-emulsification and emulsion polymerization process for synthesizing a latex for use in aggregation/coalescence processes for preparing toner, reference the processes disclosed in U.S. Pat. No. 5,403,693, wherein a stabilizer is added to a suspension of aggregates prior to heating the aggregates to a sufficiently high temperature to enable fusing, or coalescence of the aggregates, the action of the stabilizer being to prevent further growth of the aggregates during the coalescence stage. It is believed that the use of termination agents during preparation of the latexes by emulsion polymerization, namely, agents such as certain chain transfer agents which are believed to cause adequate termination either in the aqueous phase or at the interfaces of reacting latex particles during emulsion polymerization with polar comonomers, results in latex particles with improved colloidal properties in that the breakup of aggregates during the coalescence stage is minimized or prevented with better control and over a wider range of conditions than is often achieved otherwise.

The present invention in embodiments is directed to an in situ process comprised of (i) first dispersing a pigment, such as a cyan like SUNSPERSE CYAN™ or SUNSPERSE RED™, available from Sun Chemicals, in an aqueous mixture containing a cationic surfactant, such as benzalkonium chloride (SANIZOL B-50™), utilizing a high shearing device, such as an IKA/Brinkmann Polytron, or microfluidizer or sonicator; (ii) thereafter shearing this mixture with a charged latex of resin particles, such as poly(styrene/butylacrylate/acrylic acid), synthesized using a termination agent which ensures adequate termination either in the aqueous phase or at the interfaces of emulsion particles, and wherein the resin particle size ranges from about 0.01 to about 0.5 micron as measured by the Brookhaven nanosizer in an aqueous surfactant mixture containing an anionic surfactant, such as sodium dodecylbenzene sulfonate, for example NEOGEN R™ or NEOGEN SC™, and nonionic surfactant, such as alkyl phenoxy poly(ethyleneoxy) ethanol, for example IGEPAL 897™ or ANTAROX 897™, thereby resulting in a flocculation, or heterocoagulation of the resin particles with the pigment particles; (iii) further stirring for from about 1 hour to about 24 hours with optional heating at from about 0° to about 25° C. below the resin Tg, which Tg is in the range of between 45° C. to 90° C. and preferably between about 50° C. and 80° C., resulting in formation of statically bound aggregates ranging in size of from about 0.5 micron to about 10 microns in volume average diameter size as measured by the Coulter Counter (Microsizer II); and (iv) adding concentrated (from about 5 percent to about 30 percent) aqueous surfactant solution containing an anionic surfactant, such as sodium dodecylbenzene sulfonate, for example NEOGEN R™ or NEOGEN SC™, or nonionic surfactant, such as alkyl phenoxy poly(ethyleneoxy) ethanol, for example IGEPAL 897™ or ANTAROX 897™, in controlled amounts to prevent any changes in particle size and in GSD of the size distribution, which can range from about 1.16 to about 1.28, during the heating step, and thereafter, heating to 10° C. to 50° C. above the resin Tg to provide for particle fusion or coalescence of the polymer and pigment particles; followed by washing with, for example, water to remove surfactants, and drying, whereby toner particles comprised of resin and pigment with various particle size diameters can be obtained, such as from 1 to 12 microns in average volume particle diameter, and preferably in the range of 3 to 9 microns, and wherein the stirring speed in (iii) is reduced in (iv) as illustrated in U.S. Pat. No. 5,403,693. The aforementioned toners are especially useful for the development of colored images with excellent line and solid resolution, and wherein substantially no background deposits are present. This invention is directed in embodiments to the synthesis of latex particles whereby the behavior of the suspended aggregates in the heating, or coalescence step as well as properties of the generated toners are improved.

Of importance with respect to the processes of the present invention in embodiments is employing a pre-emulsification prior to the start of emulsion polymerization which comprises the steps of (i) adding the mixture of polar and nonpolar comonomers, initiators, and a mixture of chain transfer agents including at least a water soluble chain transfer agent to water containing a mixture of an anionic and a nonionic surfactant in a pre-emulsification vessel; (ii) emulsifying the content of the emulsification vessel using a mechanical stirrer to obtain a homogeneous emulsion with substantially no microsuspension droplets; (iii) transferring the homogeneous emulsion to a reactor; (iv) polymerizing the homogeneous emulsion by heating from ambient temperature, about 25° C., to about 70° C. to form a stable emulsion of polymer particles with desirable properties for aggregation/coalescence processes; and (v) controlling the amount of anionic or nonionic surfactant added to already formed aggregates, as disclosed in U.S. Pat. No. 5,403,693, to ensure, for example, that the dispersion of aggregated particles remains stable and thus can be effectively utilized in the coalescence process in a manner which maintains control of particle size and particle size distribution. The addition of the added anionic or nonionic surfactant prior to coalescence increases the repulsion between the aggregates, thus enhancing the stability of the aggregated system against a further increase in aggregate size to such an extent that the aggregates can essentially retain their particle size during the coalescence step. Controlling the amount of added surfactant can be important, especially for the preparation of small toner composite particles, since one can control particle growth in the aggregation step and retain those particles through the heating stage. These advantages are disclosed in U.S. Pat. No. 5,403,693. Conversely, the aggregates may break apart into smaller entities upon addition of this extra stabilizer and subsequent heating, which is detrimental to the process and product. The tendency of the aggregates to break apart, when it occurs, may be reduced or eliminated by reducing or eliminating formation of any undesirable polymer particles during emulsion polymerization using a pre-emulsification step.

There is illustrated in U.S. Pat. No. 4,996, 127 a toner of associated particles of secondary particles comprising primary particles of a polymer having acidic or basic polar groups and a coloring agent. The polymers selected for the toners of this '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. Also, note column 9, lines 50 to 55, wherein a polar monomer, such as acrylic acid, in the emulsion resin is necessary, and toner preparation is not obtained without the use, for example, of acrylic acid polar group, see Comparative Example I. Unlike in the present invention, aggregates in the process described by U.S. Pat. No. 4,996,127 continue to increase in size when the temperature of the suspension of aggregates is increased, including when the suspension is heated in order to fuse the aggregates. No method of minimizing or preventing the growth of aggregates prior to fusing, or coalescence is disclosed, nor is a method disclosed for reducing the tendency of aggregates to break apart upon addition of extra stabilizers and subsequent heating, when such a tendency arises. Furthermore, the use of a pre-emulsification step prior to emulsion polymerization to advantageously eliminate latex particles with undesirable properties is not disclosed. In U.S. Pat. No. 4,983,488, there is illustrated a process for the preparation of toners by the polymerization of a polymerizable monomer dispersed by emulsification in the presence of a colorant and/or a magnetic powder to prepare a principal resin component, and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 are obtained. This process is thus primarily directed to the use of coagulants, such as inorganic magnesium sulfate which results in the formation of particles with wide GSD, Similarly, the aforementioned disadvantages are noted in other prior art, such as U.S. Pat. No. 4,797,339, wherein there is disclosed a process for the preparation of toners by resin emulsion polymerization, wherein similar to the '127 patent polar resins of opposite charges are selected, and wherein flocculation is not disclosed; and U.S. Pat. No. 4,558,108, wherein there is disclosed a process for the preparation of a copolymer of styrene and butadiene by specific suspension polymerization, and not emulsion polymerization. Other patents mentioned are U.S. Pat. Nos. 3,674,736; 4,137,188 and 5,066,560.

In U.S. Pat. No. 5,290,654, the disclosure of which is totally incorporated herein by reference, there is disclosed a process for the preparation of toners comprised of dispersing a polymer solution comprised of an organic solvent and a polyester, and homogenizing and heating the mixture to remove the solvent and thereby form toner composites. Additionally, there is disclosed in U.S. Pat. No. 5,278,020, the disclosure of which is totally incorporated herein by reference, a process for the preparation of in situ toners comprising a halogenization procedure which, for example, chlorinates the outer surface of the toner and results in enhanced blocking properties.

In U.S. Pat.No. 5,308,734, the disclosure of which is totally incorporated herein by reference, there is illustrated a process for the preparation of toner compositions which comprises generating an aqueous dispersion of toner fines, ionic surfactant and nonionic surfactant, adding thereto a counterionic surfactant with a polarity opposite to that of said ionic surfactant, homogenizing and stirring sid mixture, and heating to provide for coalescence of said toner fine particles.

In U.S. Pat. No. 5,346,797, the disclosure of which is totally incorporated herein by reference, there is disclosed a processs for the preparation of toner compositttions comprising (i) preparing a pigment dispersion in a water, which dispersion is comprised of a pigment, an ionic surfactant, and optionally a charge control agent;

(ii) shearing the pigment dispersion with a latex mixture comprised of a counterionic surfactant with a charge polarity of opposite sign to that of said ionic surfactant, a nonionic surfactant and resin particles, thereby causing a flocculation or heterocoagulation of the formed particles of pigment, resin and charge control agent to form electrostatically bounded toner size aggregates; and (iii) heating the statically bound aggregated particles to form said toner composition comprised of polymeric resin, pigment and optionally a charge control agent.

Emulsion/aggregation processes for the preparation of toners are illustrated in a number of patents, such as U.S. Pat. No. 5,290,654, U.S. Pat. No. 5,278,020, U.S. Pat. No. 5,308,734, U.S. Pat. No. 5,346,797, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797, the disclosures of which are totally incorporated herein by reference. In U.S. Pat. No. 5,403,693, there is illustrated an emulsion-aggregation process where during the process there is added further anionic or nonionic surfactant in the range of from about 0.1 to about 10 percent by weight of water to control, prevent, or minimize further growth or enlargement of the particles in the coalescence step. The present patent application in embodiments relates to the use of a pre-emulsification step prior to emulsion polymerization in the preparation of polymer particles by emulsion polymerization in a manner that reduces the exotherm during polymerization, minimizes formation of polymer particles with undesirable properties and minimizes batch to batch variation of emulsion product.

SUMMARY OF THE INVENTION

It is an object of the present invention to provide toner processes with many of the advantages illustrated herein.

In another object of the present invention there are provided processes for the preparation of a stable and reproducible emulsion and processes for modifying the properties of latexes thereof. Specifically, processes to minimize or eliminate the formation of polymer particles with undesirable properties for aggregation/coalescence processes are provided. The processes for favorably modifying the emulsion polymerization to provide polymer particles with improved properties comprise performing a pre-emulsification step prior to the start of emulsion polymerization to ensure formation of a homogeneous and stable emulsion with minimum or no microsuspended droplets. This pre-emulsification step should be accomplished as indicated herein with appropriate effective temperature, stirring rate, and time that ensure formation of a homogeneous emulsion. For example, an adequate pre-emulsification temperature generally employed in embodiments is from about 3° C. to about 35° C., and preferably from about 7° C. to about 30° C., the stirring rates generally employed in embodiments are from about 50 rpm to about 600 rpm and preferably from about 100 rpm to about 400 rpm for from about 2 minutes to about 60 minutes and preferably from about 10 minutes to about 40 minutes.

In another object of the present invention there are provided a reproducible and economical two step emulsion polymerization that includes a pre-emulsification step prior to the start of emulsion polymerization, which process comprises (i) adding the mixture of polar and nonpolar comonomers, initiators, and a mixture of chain transfer agents including at least a water soluble chain transfer agent to water containing a mixture of an anionic and a nonionic surfactant in a pre-emulsification vessel; (ii) emulsifying the contents of the emulsification vessel using a mechanical stirrer to obtain a homogeneous emulsion with substantially no microsuspension droplets; (iii) transferring the homogeneous emulsion to a reactor; (iv) polymerizing the homogeneous emulsion by heating the contents of the reactor at from about ambient temperature to about 70° C., while the contents of the reactor are being mixed using a mechanical stirrer with stirring rate of from about 100 to about 400 rpm, to form a stable emulsion of polymer particles with a number average molecular weight of from about 1,000 to about 6,000, a weight average molecular weight of from about 10,000 to about 36,000, a glass transition temperature, Tg, of from about 50° C. to about 65° C., and desirable colloidal properties for aggregation/coalescence processes; and (v) controlling the amount of anionic or nonionic surfactant added to the formed aggregates, as disclosed in U.S. Pat. No. 5,403,693, to ensure, for example, that the dispersion of aggregated particles remains stable and thus can be effectively utilized in the coalescence process in a manner which maintains control of particle size and particle size distribution.

In another object of the present invention there are provided simple and economical processes for the direct preparation of black and colored toner compositions with, for example, excellent pigment dispersion and narrow size distributions, as quantified, for example, by the GSD; and wherein the aggregates formed during the process are stabilized prior to coalescence above the glass transition temperature of the latex, resulting in minimal, or no further growth of the aggregates, and minimal, or no reduction in the size of the aggregates; and wherein the latex is prepared by a two step pre-emulsification and emulsion polymerization processes using polar comonomer, such as dissociatable polar comonomer, such as acidic comonomer such as acrylic acid, and a mixture of chain transfer agent and initiator, thereby yielding latex particles all with the desired properties as evidenced by improved behavior in aggregation-coalescence processes.

In a further object of the present invention, there is provided a process for the preparation of toner comprised of resin and pigment with an average particle diameter of from between about 1 to about 50 microns, and preferably from about 1 to about 7 microns, and with a narrow GSD of from about 1.2 to about 1.3 and preferably from about 1.16 to about 1.25 as measured by the Coulter Counter.

Moreover, in a further object of the present invention there is provided a process for the preparation of toners which, after fixing to paper substrates, results in images with gloss of from 20 GGU up to 70 GGU as measured by Gardner Gloss meter matching of toner and paper.

In another object of the present invention there are provided composite polar or nonpolar toner compositions in high yields of from about 90 percent to about 100 percent by weight of toner without resorting to classification.

In yet another object of the present invention there are provided toner compositions with low fusing temperatures of from about 110° C. to about 150° C., and with excellent blocking characteristics at from about 50° C. to about 60° C.

Moreover, in another object of the present invention there are provided toner compositions with a high projection efficiency such as from about 75 to about 95 percent efficiency as measured by the Match Scan II spectrophotometer available from Milton-Roy.

In a further object of the present invention there are provided toner compositions which result in low or no paper curl.

Another object of the present invention relates to the premixing of chemical reagent for an effective time period, for example for about 30 minutes, and with stirring at 300 rpm, in water prior to emulsion polymerization at higher temperatures to provide in situ toners.

These and other objects of the present invention are accomplished in embodiments by the provision of toners and processes thereof. In embodiments of the present invention, there are provided processes for the economical direct chemical preparation of toner compositions by an improved emulsion or flocculation or coagulation, and coalescence processes, and wherein the latex is synthesized by an improved emulsion polymerization using a pre-emulsification step prior to the start of emulsion polymerization.

In embodiments the present invention comprises a process for the preparation of polymer latex particles comprising:

(a) conducting a pre-reaction emulsification, which comprises emulsification of the polymerization reagents of monomer, polar comonomer, water, surfactant, chain transfer agent, optical emulsifier, and initiator, and wherein said emulsification is accomplished at a low temperature of from about 3° to about 35° C.; and (b) accomplishing an emulsion polymerization which comprises heating the emulsified mixture of (a) in a reactor at from about 25° to about about 125° C. and retaining the contents of the reactor at said temperature of from about 25° to about 125° C. for an effective period of, for example, from about 1 to about 7 hours, followed by cooling; wherein the pre-reaction emulsified mixture is substantially free of microsuspension droplets of about 0.5 to about 30 microns in diameter and cooling is at about 25° C.; wherein the pre-reaction emulsification can be accomplished with a mechanical stirrer with a stirring rate of from about 50 to about 600 rpm for about 15 to about 60 minutes; wherein the pre-reaction emulsification is a batch process wherein all polymerization reagents are charged into the pre-emulsification vessel and then emulsified; semi-batch wherein part of polymerization reagents are charged into the pre-mulsification vessel and the remainder of reagents are fed during emulsification or continuous wherein all polymerization reagents are mixed and emulsified continuously; and a process for the preparation of toner compositions comprising:

(i) preparing a pigment dispersion, which dispersion is comprised of a pigment, an ionic surfactant, and optionally a charge control agent;

(ii) shearing the pigment dispersion with a latex or emulsion blend comprised of resin, a counterionic surfactant with a charge polarity of opposite sign to that of said ionic surfactant and a nonionic surfactant, and wherein said latex or emulsion is prepared by (a) conducting a pre-reaction emulsification which comprises emulsification of the polymerization reagents of monomer, polar comonomer, water, surfactant, chain transfer agent, and initiator, and wherein this emulsification is accomplished at a low temperature of from about 3° to about 35° C.; and (b) accomplishing an emulsion polymerization which comprises heating the emulsified mixture of (a) in a reactor at from about 25° to about 125° C. and retaining the contents of the reactor at this temperature of from about 25° to about 125° C. for an effective period of, for example, from about 1 to about 7 hours, followed by cooling;

(iii) thereby causing a flocculation or heterocoagulation of the formed particles of pigment, resin, and charge control agent;

(iv) stirring the resulting sheared viscous mixture of (iii) to form substantially stable toner size aggregates with a narrow particle size distribution;

(v) subsequently adding further surfactant in the range amount of from about 0.1 to about 10 percent by weight of water present in said latex or in said emulsions to control, prevent, or minimize further growth or enlargement of the particles in the coalescence step (vi); and (vi) heating from about 5° to about 60° C. above about the resin glass transition temperature, Tg, which resin Tg is from between about 45° C. to about 90° C. and preferably from between about 50° C. and about 80° C., thereby coalescing the statically bound aggregated particles to form said toner composition comprised of resin, pigment and optional charge control agent.

The monomers utilized in the processes of present invention can be, for example, styrene, acrylates, methacrylates, butadiene, isoprene, and the like together with polar comonomers, such as acidic or basic olefinic monomers like acrylic acid, methacrylic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The amount of monomers utilized in the processes of the present invention can be, for example, from about 15 to about 50 weight percent of the total emulsion. Known chain transfer agents, such as 1-dodecanethiol, can also be selected to modify the molecular weight when preparing resin particles. Chain transfer agents with sufficient reactivity in water or at interfaces include carbon tetrabromide, 1-butanethiol, 1-pentanethiol, 1-hexanethiol, 1heptanethiol, and 1-octanethiol, and isomers of these compounds in an amount of from about 0.1 to about 6.0 weight percent of the total monomers and polar comonomers in the emulsion. Either surfactant or surfactant free emulsion polymerizations can be used to produce the latex particles, and when surfactants are added, they can be anionic, nonionic, cationic surfactants, or mixtures thereof. Initiators utilized can be, for example, ammonium persulfate, potassium persulfate, and other initiator substances with sufficient solubility in water. The amount of initiators utilized in the processes of the present invention can be, for example, from about 0.1 to about 2.0 weight percent of the total monomers and polar comonomers in the emulsion. The reaction can be performed using known polymerization protocols, including batch and semi-batch emulsion polymerization. Once the latex is produced, it is aggregated and coalesced according to U.S. Pat. No. 5,403,693 or another aggregation-coalescence process. Other processes for obtaining resin particles of from about 0.01 micron to about 3 microns can be selected from polymer microsuspension process, such as disclosed in U.S. Pat. No. 3,674,736, the disclosure of which is totally incorporated herein by reference, and polymer solution microsuspension process, such as disclosed in U.S. Pat. No. 5,290,654, the disclosure of which is totally incorporated herein by reference.

Also, in embodiments the present invention is directed to processes for the preparation of toner compositions which comprise (i) preparing an ionic pigment mixture by dispersing a pigment, such as carbon black like REGAL 330®, HOSTAPERM PINK™, or PV FAST BLUE™ as recited in the Color Index, the disclosure of which is totally incorporated herein by reference, of from about 2 to about 10 percent by weight of toner in an aqueous mixture containing a cationic surfactant such as dialkylbenzene dialkylammonium chloride like SANIZOL B-50™ available from Kao, or MIRAPOL™ available from Alkaril Chemicals, and from about 0.5 to about 2 percent by weight of water utilizing a high shearing device such as a Brinkmann Polytron or IKA homogenizer at a speed of from about 3,000 revolutions per minute to about 10,000 revolutions per minute for a duration of from about 1 minute to about 120 minutes; (ii) adding the aforementioned ionic pigment mixture to an aqueous suspension of resin particles prepared by the two step process of this invention comprised of, (a) pre-reaction emulsification step and (b) emulsion polymerization step as illustrated herein, and comprised of, for example, poly(styrene-butylmethacrylate), PLIOTONE™, a styrene butadiene, or poly(styrene-butadiene), and which resin particles are present in various effective amounts, such as from about 40 percent to about 98 percent by weight of the toner, and wherein the polymer resin latex particle size is from about 0.1 micron to about 3 microns in volume average diameter, and counterionic surfactant, such as an anionic surfactant like sodium dodecylsulfate, dodecylbenzene sulfonate, or NEOGEN R™ from about 0.5 to about 2 percent by weight of water, a nonionic surfactant, such polyethylene glycol, polyoxyethylene glycol nonyl phenyl ether, or IGEPAL 897™ obtained from GAF Chemical Company, from about 0.5 to about 3 percent by weight of water, thereby causing a flocculation or heterocoagulation of pigment, charge control additive and resin particles; (iii) diluting the mixture with water to enable from about 50 percent to about 15 percent of solids; (iv) homogenizing the resulting flocculant mixture with a high shearing device, such as a Brinkmann Polytron or IKA homogenizer, at a speed of from about 3,000 revolutions per minute to about 10,000 revolutions per minute for a duration of from about 1 minute to about 120 minutes, thereby resulting in a homogeneous mixture of latex and pigment, and further stirring with a mechanical stirrer from about 250 to 500 rpm about below the resin Tg at, for example, about 5° to 15° C. below the resin Tg at temperatures of about 35° to 50° C. to form electrostatically stable aggregates of from about 0.5 micron to about 5 microns in average volume diameter; (v) adding additional anionic surfactant or nonionic surfactant in the amount of from 0.5 percent to 5 percent by weight of water to stabilize the aggregates formed in step (iv), heating the statically bound aggregate composite particles at from about 60° C. to about 135° C. for a duration of about 60 minutes to about 600 minutes to form toner sized particles of from about 3 microns to about 7 microns in volume average diameter and with a geometric size distribution of from about 1.2 to about 1.3 as measured by the Coulter Counter; and (vi) isolating the toner sized particles by washing, filtering and drying thereby providing composite toner particles comprised of resin and pigment. Flow additives to improve flow characteristics and charge additives, if not initially present, to improve charging characteristics may then be added by blending with the formed toner, such additives including AEROSILS® or silicas, metal oxides like tin, titanium and the like, metal salts of fatty acids formed like zinc stearate, and which additives are present in various effective amounts, such as from about 0.1 to about 10 percent by weight of the toner. The continuous stirring in step (iii) can be accomplished as indicated herein, and generally can be effected at from about 200 to about 1,000 rpm for from about 1 hour to about 24 hours, and preferably from about 12 to about 6 hours.

One preferred method of obtaining the pigment dispersion depends on the form of the pigment utilized. In some instances, pigments available in the wet cake form or concentrated form containing water can be easily dispersed utilizing a homogenizer or stirring. In other instances, pigments are available in a dry form, whereby dispersion in water is preferably effected by microfluidizing using, for example, a M-110 microfluidizer and passing the pigment dispersion from 1 to 10 times through the chamber of the microfluidizer, or by sonication, such as using a Branson 700 sonicator, with the optional addition of dispersing agents such as the aforementioned ionic or nonionic surfactants.

Illustrative examples of specific resin particles, resins or polymers selected for the process of the present invention include known polymers such as poly(styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(metamethyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); polymers such as poly(styrene-butadiene-acrylic acid), poly(styrene-butadiene-methacrylic acid), PLIOTONE™ available from Goodyear, polyethyleneterephthalate, polypropylene-terephthalate, polybutylene-terephthalate, polypentylene-terephthalate, polyhexylene-terephthalate, polyheptylene-terephthalate, polyoctylene-terephthalate, and the like. The resin selected, which generally can be, in embodiments, styrene acrylates, styrene butadienes, styrene methacrylates, or polyesters, are present in various effective amounts, such as from about 85 weight percent to about 98 weight percent of the toner, and can be of small average particle size, such as from about 0.01 micron to about 1 micron in average volume diameter as measured by the Brookhaven nanosize particle analyzer. Other sizes and effective amounts of resin particles may be selected in embodiments, for example copolymers of poly(styrene butylacrylate acrylic acid) or poly(styrene butadiene acrylic acid).

The resin selected for the process of the present invention is preferably prepared by utilizing pre-reaction emulsification as indicated herein, emulsion polymerization methods, and the monomers utilized in such processes include styrene, acrylates, methacrylates, butadiene, isoprene, and optionally acid or basic olefinic monomers, such as acrylic acid, methacrylic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups is optional, and such groups can be present in various amounts of from about 0.1 to about 10 percent by weight of the polymer resin. Known chain transfer agents, for example dodecanethiol, about 1 to about 10 percent, or carbon tetrabromide in effective amounts, such as from about 1 to about 10 percent, can also be selected when preparing the resin particles according to the process of this invention.

Various known colorants or pigments present in the toner in an effective amount of, for example, from about 1 to about 25 percent by weight of the toner, and preferably in an amount of from about 1 to about 15 weight percent, that can be selected include carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1 ™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The pigments selected are present in various effective amounts, such as from about 1 weight percent to about 65 weight percent and preferably from about 2 to about 12 weight percent, or parts of the toner. The colored pigments are known and are recited in the Color Index, the disclosure of which is totally incorporated herein by reference.

The toner may also include known charge additives in effective amounts of, for example, from 0.1 to 5 weight percent such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge enhancing additives like aluminum complexes, and the like.

Surfactants in amounts of, for example, 0.1 to about 25 weight percent in embodiments include, for example, nonionic surfactants such as dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. An effective concentration of the nonionic surfactant is in embodiments, for example from about 0.01 to about 10 percent by weight, and preferably from about 0.1 to about 5 percent by weight of monomers, used to prepare the copolymer resin.

Examples of ionic surfactants include anionic and cationic with examples of anionic surfactants being, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from DKS, and the like. An effective concentration of the anionic surfactant generally employed is, for example, from about 0.01 to about 10 percent by weight, and preferably from about 0.1 to about 5 percent by weight of monomers used to prepare the copolymer resin particles of the emulsion or latex blend.

Examples of the cationic surfactants, which are usually positively charged, selected for the toners and processes of the present invention include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Corporation, and the like, and mixtures thereof. This surfactant is utilized in various effective amounts, such as for example from about 0.1 percent to about 5 percent by weight of water. Preferably, the molar ratio of the cationic surfactant used for flocculation to the anionic surfactant used in the latex preparation is in the range of from about 0.5 to 4, and preferably from 0.5 to 2.

Counterionic surfactants are comprised of either anionic or cationic surfactants as illustrated herein and in the amount indicated, thus, when the ionic surfactant of step (i) is an anionic surfactant, the counterionic surfactant is a cationic surfactant.

Examples of the surfactant, which are added to the aggregated particles to "freeze" or retain particle size, and GSD achieved in the aggregation can be selected from the anionic surfactants such as sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from DKS, and the like. They can also be selected from nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ An effective concentration of the anionic or nonionic surfactant generally employed as a "freezing agent" or stabilizing agent is, for example, from about 0.01 to about 10 percent by weight, and preferably from about 0.5 to about 5 percent by weight of the total weight of the resin latex, pigment particles, water, ionic and nonionic surfactants mixture.

Surface additives that can be added to the toner compositions after washing or drying include, for example, metal salts, metal salts of fatty acids, colloidal silicas, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa in amounts of from 0.1 to 2 percent which can be added during the aggregation process or blended into the formed toner product.

Illustrative examples of resin or polymer particles that may be obtained with the processes of the present invention include particles of known polymers such as poly(styrene-butadiene), poly(para-methyl styrene-butadiene), poly(meta-methyl styrene-butadiene), poly(alphamethyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methylstyrene-isoprene), poly (alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), poly(butylacrylate-isoprene), polyethylene-terephthalate, polypropylene-terephthalate, polybutylene-terephthalate, polypentylene-terephthalate, and the like; copolymers with additional units corresponding to polar comonomers like acidic and basic comonomers, for example poly (styrene-butadiene-acrylic acid), poly(styrene-butadiene-methacrylic acid), and the like. The resin selected for the process of the present invention generally can be in embodiments styrene acrylates, styrene butadienes, styrene methacrylates, or the like, and are present in various effective amounts, such as from about 85 weight percent to about 98 weight percent of the toner, and can be of small average particle size, such as from about 0.01 micron to about 1 micron in average volume diameter as measured by the Brookhaven nanosize particle analyzer.

Illustrative examples of chain transfer agents to ensure adequate transfer activity in the water phase or at the interfaces of particles and the water phase can be, for example carbon tetrabromide, 1-butanethiol, 1-pentanethiol, 1-hexanethiol, 1-heptanethiol, and 1-octanethiol, isomers of these compounds, and other known chain transfer agents.

Developer compositions can be prepared by mixing the toners obtained with the processes of the present invention with known carrier particles, including coated carriers, such as steel, ferrites, and the like, reference U.S. Pat. Nos.

4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,660, the disclosure of which is totally incorporated herein by reference.

In embodiments, the present invention is directed to a process for the preparation of toner compositions comprising:

(i) preparing a pigment dispersion, which dispersion is comprised of a pigment, an ionic surfactant, and optionally a charge control agent;

(ii) shearing said pigment dispersion with a latex or emulsion blend comprised of resin, a counterionic surfactant with a charge polarity of opposite sign to that of said ionic surfactant and a nonionic surfactant, and wherein said latex or emulsion is prepared by (a) conducting a pre-reaction emulsification which comprises emulsification of the polymerization reagents of monomer, polar comonomer, water, surfactant, chain transfer agent, and initiator, and wherein said emulsification is accomplished at a low temperature of from about 3° to about 35° C.; and (b) accomplishing an emulsion polymerization which comprises heating the emulsified mixture of (a) in a reactor at from about 25° to about 125° C. and retaining the contents of the reactor at said temperature of from about 25° to about 125° C. for an effective time period, such as from about 1 to about 10 hours, and preferably 7 hours, followed by cooling;

(iii) thereby causing a flocculation or heterocoagulation of the formed particles of pigment, resin, and charge control agent;

(iv) stirring the resulting sheared viscous mixture of (iii) to form substantially stable toner size aggregates with a narrow particle size distribution;

(v) subsequently adding further surfactant in the range amount of from about 0.1 to about 10 parts or percent by weight of water present in said latex or in said emulsions to control, prevent, or minimize further growth or enlargement of the particles in the coalescence step (vi); and (vi) heating from about 5° to about 60° C. above about the resin glass transition temperature, Tg, which resin Tg is from between about 45° C. to about 90° C. and preferably from between about 50° C. and about 80° C., thereby coalescing the statically bound aggregated particles to form said toner composition comprised of resin, pigment and optional charge control agent; and processes wherein the surfactant utilized in preparing the pigment dispersion is a cationic surfactant selected in an amount of from about 0.01 weight percent to about 10 weight percent based on weight of water in the dispersion, and the counterionic surfactant in the latex mixture is an anionic surfactant selected in an amount of from about 0.2 weight percent to about 5 weight percent based on weight of water in the dispersion; and wherein the molar ratio of cationic surfactant introduced with the pigment dispersion to the anionic surfactant introduced with the latex can be varied from about 0.5 to about 5; wherein control of the particle growth in heating step (vi) can be achieved by the addition of further anionic surfactant, from about 0.02 to about 5 percent by weight of water in the emulsion in step (v) after the aggregation in step (iv); wherein the addition of further anionic surfactant in (v) further stabilizes the aggregated particles, and as a result fixes their size and particle size distribution as achieved in (iv), and wherein the particle size can be in the range of from about 3 to about 10 microns in volume average diameter, and the particle size distribution GSD is in the range of from about 1.16 to about 1.26; wherein the anionic surfactant added acts to increase the electrostatic repulsions between the aggregates, thereby increasing their stability, and wherein the aggregates formed have a volume average diameter of from about 3 to about 10 microns; wherein control of the particle growth in heating step (vi) is achieved by the addition of nonionic surfactant, from about 0.02 percent to 5 percent by weight of water in the dispersion, in step (v) after the aggregation in step (iv), and the speed in steps (v) and (vi) is from about 100 to about 600 revolutions per minute; wherein the anionic surfactant utilized for controlling, minimizing, or preventing particle growth in the coalescence step is comprised of sodium dodecyl benzene sulfonates; wherein the nonionic surfactant utilized for controlling particle growth in the coalescence step (vi) is an alkyl phenoxypoly(ethylenoxy) ethanol; wherein the heating of the statically bound aggregate particles to form toner size composite particles comprised of pigment, resin, and optional charge control agent is accomplished at a temperature of from about 60° C. to about 98° C., and for a duration of from about 10 minutes to about 8 hours; wherein the anionic surfactant concentration is about 0.1 to about 10.0 weight percent of the water in the emulsion of (a); wherein the nonionic surfactant concentration is about 0.1 to about 10.0 weight percent of the water in the emulsion of (a); wherein the initiator concentration is about 0.1 to about 2.0 weight percent of the total monomers and polar comonomers in the emulsion of (a); wherein the total chain transfers concentration is about 0.1 to about 6.0 weight percent of the total monomers and polar comonomers in the emulsion of (a); and wherein the contents of the reactor at said temperature of from about 25 to about about 125° C. is accomplished for from about 1 to about 7 hours, followed by cooling The following Examples are being submitted to further define various species of the present invention. These Examples are intended to be illustrative only and are not intended to limit the scope of the present invention. Also, parts and percentages are by weight unless otherwise indicated.

EXAMPLE I

PREPARATION OF LATEX:

A polymer latex was prepared by emulsion polymerization as illustrated herein, and more specifically, as follows.

Pre-emulsification Step 328 grams of styrene, 72 grams of butylacrylate, 8 grams of acrylic acid, 10 grams of 1-dodecanethiol, and 4 grams of carbon tetrabromide were charged in a pre-emulsification vessel containing 600 grams of deionized water in which 10 grams of sodium dodecyl benzene sulfonate anionic surfactant (NEOGEN R™), 8.6 grams of ANTAROX CA 897™ nonionic surfactant, and 4 grams of ammonium persulfate initiator were dissolved. The mixture was stirred with stirring rate of 300 rpm for 30 minutes while the temperature of the mixture was kept at 30° C. The emulsified mixture was then transferred to a reactor for polymerization.

Emulsion Polymerization Step

The pre-emulsified mixture as prepared above was transferred into a glass reactor and polymerization was initiated by heating the content of the reactor to 70° C. for 5 hours. The stirring rate during polymerization was retained at 250 rpm. A very mild exotherm of about 1° C. was observed during this emulsion polymerization. After the 5 hour polymerization, the content of the reactor was cooled to the ambient temperature, about 25° C. The resulting latex contained 60 percent of water and 40 percent of solids of the styrene-butyl acrylateacrylic acid polymer 82/18/2 parts (by weight); characterization of the resulting latex showed an average volume diameter for the polymer of 165 nanometers as measured by centrifugal sedimentation technique on a BI-DCP Particle Sizer, molecular weights of $M_w=21,000$ and $M_n=6,300$ as determined on a Hewlett Packard GPC, a zeta potential of −80 millivolts as measured on Pen Kem Inc. Laser Zee Meter and a glass transition temperature of 61.4° C. for the polymer, as measured on a DuPont DSC. The aforementioned latex was then selected for the preparation of toner.

Preparation of Toner Size Particles

Pigment Dispersion 9.6 grams of SUNSPERSE™ BHD6000 cyan pigment dispersion were dispersed in 240 grams of water with 1.8 grams of SANIZOL B-50™ cationic surfactant alkylbenzyl dimethyl ammonium chloride.

Preparation of the Aggregated Particles

The 251.4 grams of pigment dispersion described above were added simultaneously with 260 grams of the above prepared latex of Example I into a G45M continuous stirring device (Janke & Kunkel IKA Labortechnik) containing 400 grams of water and an additional 1.5 grams of SANIZOL B-50™ cationic surfactant alkylbenzyl dimethyl ammonium chloride. The pigment dispersion and the latex were well mixed by continuous pumping through the shearing chamber operating at 7,000 rpm for 3 minutes. This blend was then transferred into a kettle placed in a heating mantle and equipped with mechanical stirrer and temperature probe. The temperature of the mixture was raised from room temperature, about 25° C., to 45° C. and the aggregation was performed for 150 minutes at 45° C. Aggregates with a particle size of 5.2 microns (GSD=1.17), as measured on the Coulter Counter, were obtained.

Coalescence of Aggregated Particles 70 milliliters of a solution of NEOGEN R™ sodium dodecylbenzene sulfonate anionic surfactant containing 20 percent of the anionic surfactant were added to the above suspension of aggregates to prevent any further change in aggregate size. The stirring speed was reduced from 400 to 150 rpm, and the temperature of the aggregated particles in the kettle was then raised to 93° C., and retained at 93° C. for 4 hours to coalesce the aggregates. At the end of the coalescence step, the particle size was 5.3 microns with a GSD=1.19. All particle sizes were measured on a Coulter Counter.

The resulting toner was comprised of about 95 percent of polymer, poly(styrene-butylacrylate-acrylic acid), and cyan pigment, about 5 percent by weight of toner, with an average volume diameter of 5.3 microns and a GSD of 1.19, indicating that by adding an extra amount of anionic surfactant prior to increasing the kettle temperature above the resin Tg to accomplish the coalescence, and reducing the stirring speed, one can retain particle size and GSD achieved in the aggregation step during coalescence without the aggregates falling apart and without an excessive increase in particle size, when a pre-emulsification step prior to the start of emulsion polymerization was used to ensure the formation of stable latex particles with desirable properties. The toner particles were then washed by filtration using hot water (50° C.) and dried on the freeze dryer.

Washing by filtration with hot water and drying with a freeze dryer were utilized in all the Examples unless otherwise indicated.

EXAMPLE II

The processes of Example I were repeated with the exceptions that in the pre-emulsification step the temperature of pre-emulsification was changed to 11° C. and the stirring rate was changed to 200 rpm. The resulting latex contained 60 percent of water and 40 percent of solids of the styrene-butyl acrylate-acrylic acid polymer 82/18/2 parts (by weight); characterization of the resulting latex showed an average volume diameter of 167 nanometers as measured by centrifugal sedimentation technique on a BI-DCP Particle Sizer, molecular weights of $M_w=21,000$ and $M_n=6,400$ as determined on a Hewlett Packard GPC, a zeta potential of −82 millivolts as measured on a Pen Kem Inc. Laser Zee Meter, and a glass transition temperature of 61.4° C. as measured on a DuPont DSC. The resulting toner was comprised of about 95 percent of polymer, poly(styrene-butylacrylateacrylic acid), and cyan pigment, about 5 percent by weight of toner, with an average toner volume diameter of 4.9 microns and a GSD of 1.18, indicating that by adding an extra amount of anionic surfactant prior to increasing the kettle temperature above the resin Tg to accomplish the coalescence, and reducing the stirring speed, one can retain particle average volume diameter size of 4.9 and GSD of 1.18 achieved in the aggregation step during coalescence, without the aggregates falling apart and without an excessive increase in particle size, when a pre-emulsification step prior to the start of emulsion polymerization was used to ensure the formation of stable latex particles with desirable properties. The toner particles were then washed by filtration using hot water (50° C.) and dried on a freeze dryer. The final toner had an average volume diameter of 4.9 microns and a GSD of 1.18.

EXAMPLE III

The processes of Example I were repeated with the exceptions that in the pre-emulsification step the temperature of pre-emulsification was changed to 20° C., the stirring rate was changed to 150 rpm and the emulsification time was changed to 60 minutes. The resulting latex contained 60 percent of water and 40 percent of solids of the styrene-butyl acrylate-acrylic acid polymer 82/18/2 parts (by weight); characterization of the resulting latex evidenced an average volume diameter of 164 nanometers as measured by centrifugal sedimentation technique on a BI-DCP Particle Sizer, molecular weights of $M_w=21,776$ and $M_n=6,882$ as determined on a Hewlett Packard GPC, a zeta potential of −82 millivolts as measured on a Pen Kem Inc. Laser Zee Meter, and a glass transition temperature of 60.7° C. as measured on a DuPont DSC. The resulting toner was comprised of about 95 percent of polymer, poly(styrene-butylacrylateacrylic acid), and cyan pigment, about 5 percent by weight of toner, with an average volume diameter of 4.7 microns and a GSD of 1.18, indicating that by adding an extra amount of anionic surfactant prior to increasing the kettle temperature above the resin Tg to accomplish the coalescence, and reducing the stirring speed, one can retain particle size and GSD achieved in the aggregation step during coalescence, without the aggregates falling apart and without an excessive increase in particle size, when a pre-emulsification step prior to the start of emulsion polymerization was used to ensure the formation of stable latex particles with desirable properties for the aggregation and coalescence steps. The toner particles were then washed by filtration using hot water (50° C.) and dried on a freeze dryer.

EXAMPLE IV

The processes of Example I were repeated with the exceptions that in the pre-emulsification step the temperature of pre-emulsification was changed to 5° C. and the stirring rate was changed to 400 rpm. The resulting latex contained 60 percent of water and 40 percent of solids of the styrene-butyl acrylate-acrylic acid polymer 82/18/2 parts (by weight); characterization of the resulting latex showed an average volume diameter of 170 nanometers as measured by centrifugal sedimentation technique on a BI-DCP Particle Sizer, molecular weights of $M_w$=21,000 and $M_n$=6,300 as determined on a Hewlett Packard GPC, a zeta potential of −82 millivolts as measured on a Pen Kem Inc. Laser Zee Meter, and a glass transition temperature of 61.8° C. as measured on a DuPont DSC. The resulting toner was comprised of about 95 percent of polymer, poly(styrene-butylacrylateacrylic acid), and cyan pigment, about 5 percent by weight of toner, with an average volume diameter of 5.0 microns and a GSD of 1.17, indicating that by adding an extra amount of anionic surfactant prior to increasing the kettle temperature above the resin Tg to accomplish the coalescence, and reducing the stirring speed, one can retain particle size and GSD achieved in the aggregation step during coalescence, without the aggregates falling apart and without an excessive increase in particle size, when a pre-emulsification step prior to the start of emulsion polymerization was used to ensure the formation of stable latex particles with desirable properties. The toner particles were then washed by filtration using hot water (50° C.) and dried on a freeze dryer. The final toner had an average volume diameter of 5.0 microns and a GSD of 1.17.

EXAMPLE V

PROCESS REPRODUCIBILITY

PREPARATION OF LATEX

Four batches of polymer latex were prepared as follows:

Pre-emulsification Step 328 grams of styrene, 72 grams of butylacrylate, 8 grams of acrylic acid, 10 grams of 1-dodecanethiol, and 4 grams of carbon tetrabromide were charged in a pre-emulsification vessel containing 600 grams of deionized water in which 10 grams of sodium dodecyl benzene sulfonate anionic surfactant (NEOGEN R™), 8.6 grams of ANTAROX CA 897™ nonionic surfactant and 4 grams of ammonium persulfate initiator were dissolved. The mixture was stirred at a stirring rate of 300 rpm for 30 minutes while the temperature of the mixture was kept at 8° C. The emulsified mixture was then transferred to a reactor for polymerization.

Emulsion Polymerization Step

The pre-emulsified mixture as prepared in the above step was transferred into a glass reactor and polymerization initiated by heating the contents of the reactor to 70° C. for 5 hours, and stirring during polymerization was kept at 300 rpm. A very mild exotherm of about 1° C. was observed during this emulsion polymerization. At the end of a 5 hour polymerization, the contents of the reactor were cooled to ambient temperature, about 25° C. The resulting latex contained 60 percent of water and 40 percent of solids of the styrene-butyl acrylateacrylic acid polymer 82/18/2 parts (by weight); characterization of the resulting four batches of latex are shown in the following table.

TABLE 1

| PROPERTIES OF LATEX PREPARED USING THE PROCESS OF THIS INVENTION | | | | |
|---|---|---|---|---|
| BATCH NO. | LATEX DIAMETER (nm) | Tg °C. | $M_n$ | $M_w$ |
| 1 | 167 | 61.4 | 6,400 | 21,000 |
| 2 | 168 | 61.4 | 6,300 | 19,000 |
| 3 | 165 | 59.2 | 6,600 | 19,000 |
| 4 | 170 | 61.8 | 6,300 | 21,000 |

Table 1 shows an average volume diameter of 168 nanometers as measured by centrifugal sedimentation technique on a BI-DCP Particle Sizer, molecular weights of $M_w$=20,000 and $M_n$=6,400 as determined on a Hewlett Packard GPC, a zeta potential of −80 millivolts as measured on a Pen Kem Inc. Laser Zee Meter, and a glass transition temperature of 61.0° C. as measured on a DuPont DSC. The aforementioned four batches of latex were then selected for the toner preparation of Example V.

PREPARATION OF TONER SIZE PARTICLES

Pigment Dispersion

Four batches of cyan pigment dispersion were prepared, each containing 9.6 grams of SUNSPERSE™ BHD6000 cyan pigment dispersion, available from Sun Chemicals, dispersed in 240 grams of water with 1.8 grams of SANIZOL B-50™ cationic surfactant alkylbenzyl dimethyl ammonium chloride.

Preparation of the Aggregated Particles

Four batches of toners were prepared using four batches of the above prepared latex. The 251.4 grams of the pigment dispersion described above were added simultaneously with 260 grams of the above prepared latex into a G45M continuous stirring device (Janke & Kunkel IKA Labortechnik) containing 400 grams of water and an additional 1.5 grams of SANIZOL B 50™ cationic surfactant alkylbenzyl dimethyl ammonium chloride. The pigment dispersion and the latex were well mixed by continuous pumping through the shearing chamber operating at 7,000 rpm for 3 minutes. This blend was then transferred into a kettle placed in a heating mantle, and equipped with mechanical stirrer and temperature probe. The temperature of the mixture was raised from room temperature to 45° C. and the aggregation was performed for 150 minutes at 45° C.

Coalescence of Aggregated Particles 70 milliliters of a solution of NEOGEN R™ sodium dodecylbenzene sulfonate anionic surfactant containing 20 percent of the anionic surfactant were added to the suspension of the above prepared aggregates to prevent any further change in aggregate size. The stirring speed was reduced from 400 to 150 rpm, and the temperature of the aggregated particles in the kettle was then raised to 93° C., and kept at 93° C. for 4 hours to coalesce the aggregates. The above aggregation and coalescence were used for each batch of latex to prepare four batches of toner. At the end of the coalescence step, the particle size of each batch was measured on a Coulter Counter. Results are shown in Table 2.

TABLE 2

PROPERTIES OF TONERS PREPARED USING THE PROCESS OF THIS INVENTION

| BATCH NO. | $d_{50}$ (Micron) | GSD |
| --- | --- | --- |
| 1 | 5.1 | 1.18 |
| 2 | 5.2 | 1.18 |
| 3 | 4.9 | 1.19 |
| 4 | 5.3 | 1.17 |

The resulting four batches of toner each were comprised of about 95 percent of polymer, poly(styrene-butylacrylate-acrylic acid), and cyan pigment, about 5 percent by weight of toner, with an average volume diameter and GSD shown in the above table, by adding an extra amount of anionic surfactant prior to increasing the kettle temperature above the resin Tg to accomplish the coalescence, and reducing the stirring speed, one can retain particle size and GSD achieved in the aggregation step during coalescence without the aggregates falling apart.

The resulting four batches of toner each were comprised of about 95 percent of polymer, poly(styrene-butylacrylate-acrylic acid), and cyan pigment, about 5 percent by weight of toner, with an average volume diameter and GSD shown in Table 2. By adding an extra amount of anionic surfactant prior to increasing the kettle temperature above the resin Tg to accomplish the coalescence, and reducing the stirring speed, one can retain particle size and GSD achieved in the aggregation step during coalescence without the aggregates falling apart and without an excessive increase in particle size when a pre-emulsification step prior to the start of emulsion polymerization was used to ensure the formation of stable latex particles with desirable properties. The toner particles were then washed by filtration using hot water (50° C.) and dried on the freeze dryer. These results indicate, for example, the reproducibility of processes of the present invention.

Washing by filtration with hot water and drying with a freeze dryer were utilized in all the Examples unless otherwise indicated.

COMPARATIVE EXAMPLE I A

NO PRE-EMULSIFICATION

A polymer latex was prepared by the process of Example I without using the pre-emulsification step following conventional known emulsion polymerizations.

328 Grams of styrene, 72 grams of butylacrylate, 8 grams of acrylic acid, 10 grams of 1-dodecanethiol, and 4 grams of carbon tetrabromide were charged directly into a reactor containing 600 grams of deionized water in which 10 grams of sodium dodecyl benzene sulfonate anionic surfactant (NEOGEN R™), 8.6 grams of ANTAROX CA 897™ nonionic surfactant and 4 grams of ammonium persulfate initiator were dissolved. The mixture was then polymerized at 70° C. for 5 hours. The mixture was stirred during polymerization at 250 rpm. A high exotherm of about 4.5° C. was observed during this emulsion polymerization. This higher level of exotherm observed in this Example compared to that of Example I indicates that use of the pre-emulsification step of this invention can reduce the exotherm during emulsion polymerization and, therefore, the safety risk thereof. At the end of the 5 hour polymerization, the contents of the reactor were cooled to ambient temperature, about 25° C. The resulting latex contained 60 percent of water and 40 percent of solids of the styrenebutyl acrylate-acrylic acid polymer, 82/18/2 parts (by weight). About 7 weight percent of prepared latex contained undesirable polymer particles with low $M_n$=1,900 and a low glass transition temperature of 29° C. This undesirable portion of latex can be removed from the rest of latex by a known sedimentation technique. The amount of this undesirable latex can be significantly reduced by the pre-emulsification step of Example I. In this Example, the undesirable polymer particles were not removed in order to be able to compare the results of this Example with Example I. Characterization of the resulting latex showed an average volume diameter of 165 nanometers as measured by centrifugal sedimentation technique on a BI-DCP Particle Sizer, molecular weights of $M_w$=18,000 and $M_n$=5,400 as determined on a Hewlett Packard GPC, a zeta potential of −80 millivolts as measured on a Pen Kem Inc. Laser Zee Meter, and a glass transition temperature of 59.1° C. as measured on a DuPont DSC. The aforementioned latex was then selected for the toner preparation of Comparative Example IA.

Pigment Dispersion 12 grams of SUNSPERSE™ BHD6000 cyan pigment dispersion were dispersed in 300 grams of water with 2.0 grams of SANIZOL B-50™ cationic surfactant alkylbenzyl dimethyl ammonium chloride.

Preparation of Toner Size Particles

Preparation of the Aggregated Particles

The 314 grams of pigment dispersion described above were added simultaneously with 325 grams of the above prepared latex into a G45M continuous stirring device (Janke & Kunkel IKA Labortechnik) containing 500 grams of water, and an additional 1.83 grams of ZANIZOL B-50™ cationic surfactant alkylbenzyl dimethyl ammonium chloride were also added. The pigment dispersion and the latex were well mixed by continuous pumping through the shearing chamber operating at 7,000 rpm for 3 minutes. This blend was then transferred into a kettle placed in a heating mantle, and equipped with mechanical stirrer and temperature probe. The temperature of the mixture was raised from room temperature to 45° C. and the aggregation was performed for 45 minutes at 45° C. Aggregates with a particle size of 5.9 microns (GSD=1.23), as measured on the Coulter Counter, were obtained.

Coalescence of Aggregated Particles 90 milliliters of a solution of NEOGEN R™ sodium dodecylbenzene sulfonate anionic surfactant containing 20 percent of the anionic surfactant were added to the suspension of aggregates to prevent any further change in aggregate size. The stirring speed was reduced from 400 to 150 rpm, and the temperature of the aggregated particles in the kettle was then raised to 93° C., and kept at 93° C. for 4 hours to coalesce the aggregates. After 5 minutes, the particle size was less than 1.35 microns, indicating that the aggregates were falling apart. All particle sizes were measured on a Coulter Counter Multisizer II.

The aggregation at 45° C. was repeated with separate samples of the pigment dispersion and latex, after which the aggregates were coalesced without the addition of extra anionic surfactant- In the coalescence of this sample, the stirring speed was reduced from 400 to 150 rpm, and temperature of the aggregated particles in the kettle was then raised to 90° C., and kept at 90° C. for 4 hours to coalesce the aggregates; no anionic surfactant was added after the aggregation at 45° C. was completed. The aggregate size grew during the coalescence step to 6.5 microns with a GSD of 1.26.

These results indicate that the use of pre-emulsification of this invention reduces the exotherm observed during emulsion polymerization and minimizes/eliminates the amount of undesirable polymer particles made during emulsion polymerization which causes the aggregates to have a greater propensity to fall apart. As demonstrated by this Comparative Example, the use of the pre-emulsification step of this invention prior to the emulsion polymerization can reduce the exotherm during polymerization and can yield latexes with desirable behavior with respect to aggregation processes like those described herein.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. A process for the preparation of toner particles comprising:
   (i) preparing a pigment dispersion, which dispersion is comprised of a pigment, an ionic surfactant, and optionally a charge control agent;
   (ii) paring latex or emulsion blend comprised of resin, a counterionic surfactant with a charge polarity of opposite sign to that of said ionic surfactant and a nonionic surfactant by (a) conducting a pre-reaction emulsification which comprises emulsification of the polymerization reagents of monomer, polar comonomer, water, surfactant, chain transfer agent, and initiator, and wherein said emulsification is accomplished at a low temperature of from about 3° to about 35° C.; and (b) accomplishing an emulsion polymerization which comprises heating the emulsified mixture of (a) in a reactor at from about 25° to about 125° C. and retaining the contents of the reactor at said temperature of from about 25° to about 125° C. for an effective time period, from about 1 to about 10 hours, and preferably 7 hours, followed by cooling;
   (iii) shearing said pigment dispersion with said latex or emulsion blend thereby causing a flocculation or heterocoagulation of the formed particles of pigment, resin, and optional charge control agent;
   (iv) stirring the resulting formed particles of resin, pigment and optional charge control agent of (iii) to form substantially stable toner size aggregates with a narrow particle size distribution;
   (v) subsequently adding further surfactant in the range amount of from about 0.1 to about 10 parts or percent by weight of water present in said latex or in said emulsion to control, prevent, or minimize further growth or enlargement of the particles in the coalescence step (vi); and
   (vi) heating from about 5° to about 60° C. above about the resin glass transition temperature, Tg, which resin Tg is from between about 45° C. to about 90° C., thereby coalescing the statically bound aggregated particles to form said toner particles comprised of resin, pigment and optional charge control agent.

2. A process in accordance with claim 1 wherein the surfactant utilized in preparing the pigment dispersion is a cationic surfactant selected in an amount of from about 0.01 weight percent to about 10 weight percent based on weight of water in the dispersion, and the counterionic surfactant in the latex mixture is an anionic surfactant selected in an amount of from about 0.2 weight percent to about 5 weight percent based on weight of water in the dispersion; and wherein the molar ratio of cationic surfactant introduced with the pigment dispersion to the anionic surfactant introduced with the latex can be varied from about 0.5 to about 5.

3. A process in accordance with claim 1 wherein control of the particle growth in heating step (vi) can be achieved by the addition of further anionic surfactant, from about 0.02 to about 5 percent by weight of water in the emulsion in step (v) after the aggregation in step (iv).

4. A process in accordance with claim 1 wherein the addition of further anionic surfactant in (v) further stabilizes the aggregated particles, and as a result fixes their size and particle size distribution as achieved in (iv), and wherein the particle size can be in the range of from about 3 to about 10 microns in volume average diameter, and the particle size distribution GSD is in the range of from about 1.16 to about 1.26.

5. A process in accordance with claim 4 wherein the anionic surfactant added acts to increase the electrostatic repulsions between the aggregates, thereby increasing their stability, and wherein the aggregates formed have a volume average diameter of from about 3 to about 10 microns.

6. A process in accordance with claim 1 wherein control of the particle growth in heating step (vi) is achieved by the addition of nonionic surfactant, from about 0.02 percent to 5 percent by weight of water in the dispersion, in step (v) after the aggregation in step (iv).

7. A process in accordance with claim 1 wherein the anionic surfactant utilized for controlling, minimizing, or preventing particle growth in the coalescence step is comprised of sodium dodecyl benzene sulfonates.

8. A process in accordance with claim 1 wherein the nonionic surfactant utilized for controlling particle growth in the coalescence step (vi) is an alkyl phenoxypoly(ethylenoxy) ethanol.

9. A process in accordance with claim 1 wherein the heating of the statically bound aggregate particles to form toner size composite particles comprised of pigment, resin, and optional charge control agent is accomplished at a temperature of from about 60° C. to about 98° C., and for a duration of from about 10 minutes to about 8 hours.

10. A process in accordance with claim 1 wherein the polymer or resin formed subsequent to (iii) is selected from the group consisting of poly(styrene-butadiene), poly(para-methyl styrene-butadiene), poly(meta-methyl styrene-butadiene), poly(alpha-methylstyrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(ethylacrylate-butadiene), poly(propylacrylate-butadiene), poly(butylacrylate-butadiene), poly(styrene-isoprene), poly(para-methyl styrene-isoprene), poly(meta-methyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene).

11. A process in accordance with claim 1 wherein the polymer formed is from about 0.01 to about 3 microns in average volume diameter, the pigment particles are from about 0.01 to about 1 micron in volume average diameter, the toner isolated is from about 3 to about 15 microns in average volume diameter, and the geometric size distribution thereof is from about 1.16 to about 1.30.

* * * * *